United States Patent

[11] 3,627,296

[72] Inventors: Johannes Uerlichs, Woffelsbach/Eifel; Rudolf Muller, Merzenich; Wilhelm Kuckertz, Konzendorf, all of Germany
[21] Appl. No. 18,066
[22] Filed Mar. 10, 1970
[45] Patented Dec. 14, 1971
[73] Assignee Hermann Rappold & Co. Duren-Birkesdorf, Germany
[32] Priority Mar. 10, 1970
[33] Germany
[31] P 19 11 938.1

[54] COOLED BLOW MOLD FOR INDUSTRIAL FURNACES PARTICULARLY BLAST FURNACES
9 Claims, 5 Drawing Figs.
[52] U.S. Cl................................................ 266/41, 239/132.3
[51] Int. Cl................................................ C21b 7/16
[50] Field of Search................................... 239/132.3; 266/34 L, 41

[56] References Cited
UNITED STATES PATENTS
| | | | |
|---|---|---|---|
| 257,571 | 5/1882 | Gordon .................... | 266/41 |
| 2,937,864 | 5/1960 | Kesterton ................ | 266/41 |

Primary Examiner—Gerald A. Dost
Attorney—Wenderoth, Lind and Ponack

ABSTRACT: A cooled blow mold for industrial furnaces, particularly blast furnaces, wherein the feeding of the cooling agent is led in between an outer and an inner blow mold jacket which enclose the cooling chamber directly to the blow head. A ring chamber is located at the blow head and the cooling agent is led from there through the cooling chamber to the outflow of the cooling agent connected to the blow mold foot. A concentrical displacement body is set in the cooling chamber which receives the feeding line. The displacement body divides the cooling chamber into an outer, an inner and through a radial ring wall into an annular chamber of the blow head. Overflow openings are provided for the cooling agent in the ring wall in the cross-sectional area of the outer and the inner annular chamber, through which the cooling agent is led along both annular chambers to the outflow of the cooling agent.

INVENTORS
JOHANNES UERLICHS
RUDOLF MÜLLER
WILHELM KUCKERTZ

BY *Wenderoth, Lind & Ponack*
ATTORNEYS

PATENTED DEC 14 1971 3,627,296

INVENTORS
JOHANNES UERLICHS
RUDOLF MÜLLER
WILHELM KUCKERTZ

BY *Wenderoth, Lind & Ponack*
ATTORNEYS

INVENTORS
JOHANNES UERLICHS
RUDOLF MÜLLER
WILHELM KUCKERTZ

BY *Wenderoth, Lind & Ponack*
ATTORNEYS

COOLED BLOW MOLD FOR INDUSTRIAL FURNACES PARTICULARLY BLAST FURNACES

This invention relates to a cooled blow mold for industrial furnaces, particularly blast furnaces, such as are built into the furnace wall and are used for blowing hot air into the furnace chamber.

These blow molds are subjected generally to the greatest thermal and mechanical wear at the free and unprotected so-called blow head which projects into the furnace, and which constitutes the front part of the form. It is therefore important to construct the blow mold in such a way, that the blow head can be optimally cooled. The known blow molds fulfill only insufficiently this requirement.

It is known in the case of a blast tuyere for shaft furnaces, that the cooling agent is led through a helical twin tube spiral which is twisted around the internal conical blow mold jacket (inner tube) from the inflow of the blow mold foot first through the outer spiral to the blow head and subsequently over the internal spiral back to the outflow located in the blow mold foot. Besides the fact that such blow molds are very expensive and quite unstable, their cooling action remains unsatisfactory, since the cooling agent in the outer spiral on its way to the blow head through absorption of heat from the furnace walls is already heated to such a point that it is not able to absorb enough heat from the blow head and to carry it off.

This disadvantage has been realized, and an attempt has been made to overcome it in a further known cooled blow mold by feeding the cooling agent between an outer and an inner conical blow mold jacket which encloses the cooling chamber through a flow-in pipe directly to the blow head, particularly to an annular chamber which is located there, so that the cooling agent can arrive practically in its cold condition directly to the hottest zone of the blow mold. From there it is taken along the outer jacket again in helical pipes jointed to each other to the blow mold foot and again is taken in a pipe near to the blow head, and from there it goes again to the blow mold foot and the flowout by passing through the cooling chamber formed by the internal blow mold jacket and the internal jacket of the tube spiral of the exterior jacket. A greatly increased sectional area prevents a higher rotational speed of the cooling agent in the blow head and thus reduces the cooling effect. By returning again the hot water coming out of the blow head zone into the area of the blow head produces a decrease of the rotational speed and the cooling effect speed and the cooling effect in the interior jacket of the blow mold.

An object of the invention, based on the latter category of blow molds, is to remove the above disadvantages by feeding the cooling agent directly to the blow head, in order to bring as rapidly as possible an entirely cold cooling agent to the area of the blow mold which is under the highest thermal stress and most endangered, and it is its aim, besides eliminating the already mentioned disadvantages to allow by means of a relatively simple, inexpensive construction of a blow mold to obtain an optimal velocity of flow of the cooling agent in the blow head with sufficiently good retroactive cooling of the inner and outer jacket of the blow mold as well as allowing by changing the flow sections to obtain and adaptation of the cooling performance to the different plant condition with regard to furnace temperature, pressure and consumption of the cooling agent, etc.

For this object in a cooled blow mold of the above mentioned type according to this invention there is a displacement body set concentrically in the cooling chamber which preferably picks up the feed pipe, and which divides the cooling chamber into an outer, and inner and through a radial ring wall into an annular chamber of the blow head, and further in the ring wall in the cross-sectional area of the outer and inner annular chamber there are overflow openings for the cooling agent through which the cooling agent is led along both annular chambers to the cooling agent outlet.

It is advantageous when there is an overflow opening in the annular chamber of the blow head which is separated directly through a partition next to the mouth of the feeding line and one along the turned away side of the mouth of the feeding line in the cross-sectional area of the outer and inner annular chamber.

Through the displacement body which can also be formed like a flow through hollow body it has been possible in the traditional blow molds to subdivide in a very suitable way the classical cooling chamber formed by an outer and an inner jacket into an outer cooling chamber related to the outer jacket, into an inner jacket related to the inner cooling chamber and into a cooling chamber which is directed with its frontal surface to the blow head, that is to say into three annular chambers, whereby their sections can be easily determined by adequately measuring this displacement body.

According to another aspect of the invention, the feeding line for the cooling agent which leads directly to the blow head can be used as a displacement body coaxially set inside the cooling chamber, whereby its end which projects into the blow head has an outlet nozzle with a torus directed to the frontal area of the blow head. Since through the torus there is an increase in size of the diameter of the displacement body in this area, which determines the flow speed of the cooling agent in the blow head, the smaller outer diameter of the displacement body next to the torus prevents losses of pressure when the cooling agent flows back along the outer and inner cooling chamber.

The flow and pressure conditions in the blow head in an advantageous further development of the invention can be changed in such a way that the displacement body in order to change the size of the flow-through cross section in the area of the annular chamber of the blow head can be axially displaced and locked into position. For this purpose there can be provided several regulating units in the tuyere bottom of the torus of the displacement body, preferably adjusting screws which grip through the tuyere bottom and brace themselves against the inner surface of the annular chamber of the blow head, and the connection of the feed pipe set in the foot of the blow mold together with the displacement body can be done through an axially movable closed linkage.

In order to always assure a coaxial position of the displacement body inside the inner and outer jackets of the blow mold, particularly during its axial adjustment, range spacers can be set on the inner jacket of the displacement body. In order to obtain the best flow conditions in the inner and outer annular chambers which receive the flowing back cooling agent as well as a good heat exchange on the inner and outer jacket (avoiding for instance boundary layers, turbulences, etc.) the outer and inner annular chambers of the cooling chamber can have a fin radially directed, and running helical to the foot of the blow mold. Additionally the fins in the area of the blow head can run first at a distance in single spiral turns, and then can go over to helical pitch. This has the advantage that the cold cooling agent directly led from the outside into the blow head flows in a circular pattern several times through the ring-shaped cooling chamber before it returns to the foot of the blow mold to be let out via the inner and outer annular chambers of the cooling chamber.

With the above and other objects in view which will become apparent from the detailed description below some preferred embodiments of the invention are shown in the drawings, in which.

Figure 1:
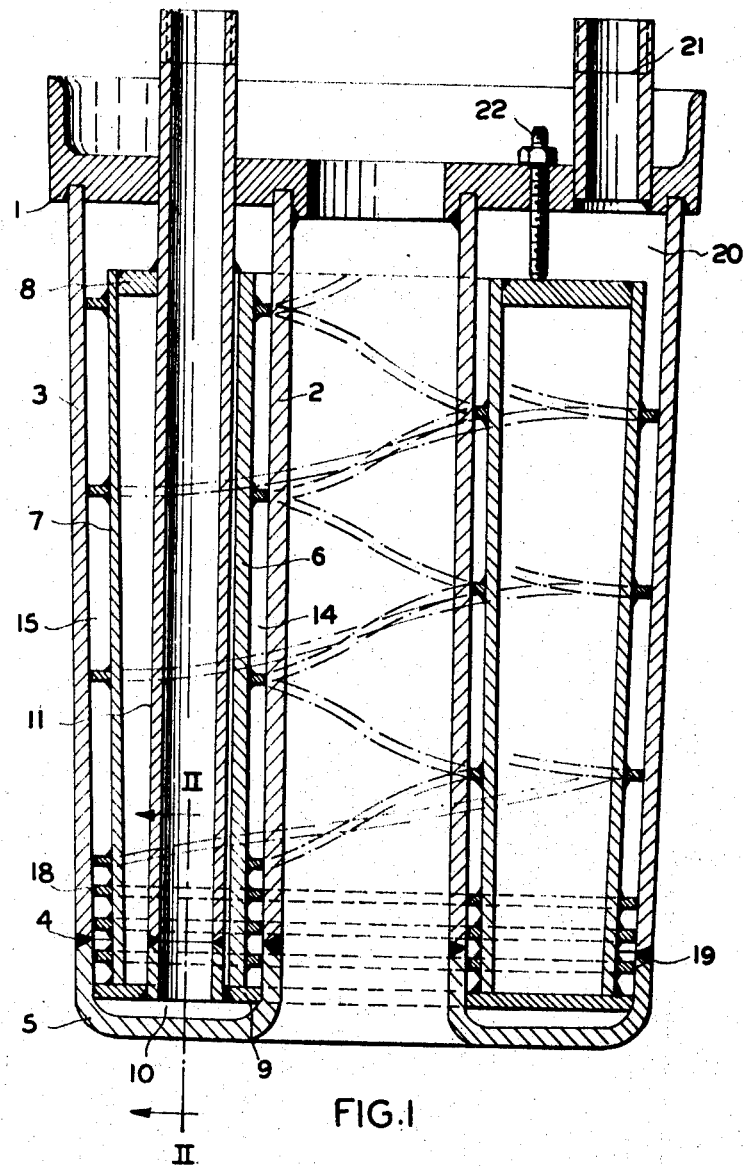
FIG. 1 shows a blow mold in a longitudinal section.

On the blow mold foot 1 of a blast furnace blow mold according to FIG. 1 there is welded as an inner jacket a pipe 2 and an outer jacket a conical pipe 3 which is tapered in the direction of the blow head and which in a cross section is ring shaped. Both pipes are connected on their free ends by a ring shell 5 welded at 4, which forms the blow head.

A further pipe 6, which has a larger diameter than pipe 2, and an equally long pipe 7 conically tapered in the direction of the blow head which in its cross section is equally circular shaped and which is of a smaller diameter than the diameter of the outer jacket pipe 3, are coaxially connected with each other through ring walls 8 and 9 welded on either frontal surface forming a hollow body, which as a displacement body is set coaxially into a cooling chamber formed by the inner and outer jacket 2 and 3.

Ring wall 9 overlaps in the form of a flange the inner and the outer diameter of the displacement body to such an extent that besides the coaxial centering of the displacement body inside the cooling chamber formed by the inner and outer jacket 2 and 3 an annular chamber 10 is formed at the same time inside the blow head. Through a feeding pipe 11 which runs through the blow mold foot and the displacement body the cold water cooling agent is forced directly into annular chamber 10 of the blow head.

Figure 2:
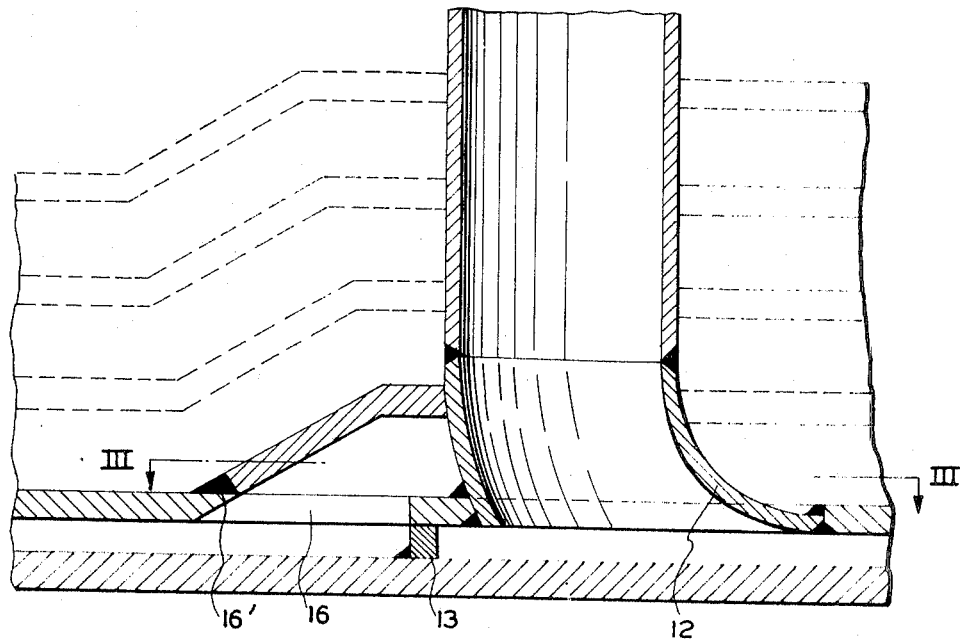
FIG. 2 shows the blow head of FIG. 1 in a partial section along the line II—II in FIG. 1.
Figure 3:
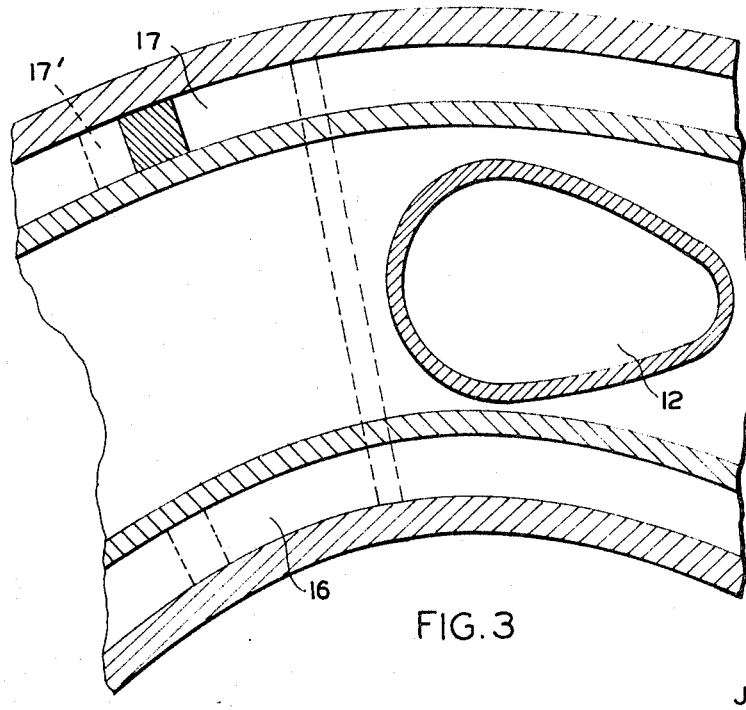
FIG. 3 shows a partial section through the blow head along the line III—III in FIG. 2.

In order that it can circulate in a determined direction and so that the cross section surface of the pipe at the mouth of the pipe cannot be changed, the pipe mouth is slightly bent (FIG. 2) and has an approximate teardrop-shaped cross section (FIG. 3). Annular chamber 10 is separated by a dividing wall 13 set directly next to the pipe mouth 12 (FIGS. 2 and 3), so that the inflowing cooling agent can almost make a rotation inside the annular chamber, in order to reach the cooling chambers 14 and 15 respectively through either one of the slit openings 16 and 17 set in the ring wall 9 in the area of the cross-sectional surfaces of the inner cooling chamber 14 and the outer cooling chamber 15.

Both cooling chambers 14 and 15 are provided with a fin shown at 16' and 17' dotted, welded on the ring wall 9. The fins 18 and 19 cross helically twisted the cooling chambers 14 and 15 at the distance of their generated surfaces 2, 3 to the jacket of the displacement body 6, 7. At the beginning 16 and 17 respectively they start in the area of the blow head with approximately three windings parallel to each other which then go over to windings which have an increased pitch. The fins are always welded onto the inner jacket 6 and to the outer jacket 7 respectively of the displacement body. The cross section in the annular chamber 10 determines the desired rotational speed of the cooling agent and can be kept in such a way that the cooling agent reaches a rotational speed of approximately 7m./sec. which decreases only slightly in the parallel conduits of the blow head, in order to decrease gradually in the helical conduits which have a relatively higher pitch going towards the blow mold foot in order to flow out through an outflow pipe 21 which is fastened in the blow mold foot and is connected with the cooling chambers 14 and 15 which come together in annular chamber 20.

The displacement body for economical construction reasons may be cast. Three adjusting screws 22 or similar means set at an equal distance from each other at the periphery of the blow mold foot and penetrating it hold tight over wall 8 the displacement body in the cooling room of the blow mold and allow, when releasing against the pressure existing in the annular chamber 10, an axial displacement of the displacement body and thus a size increase of the cross section of the annular chamber 10 as compared to the shown minimum size.

Figure 4:
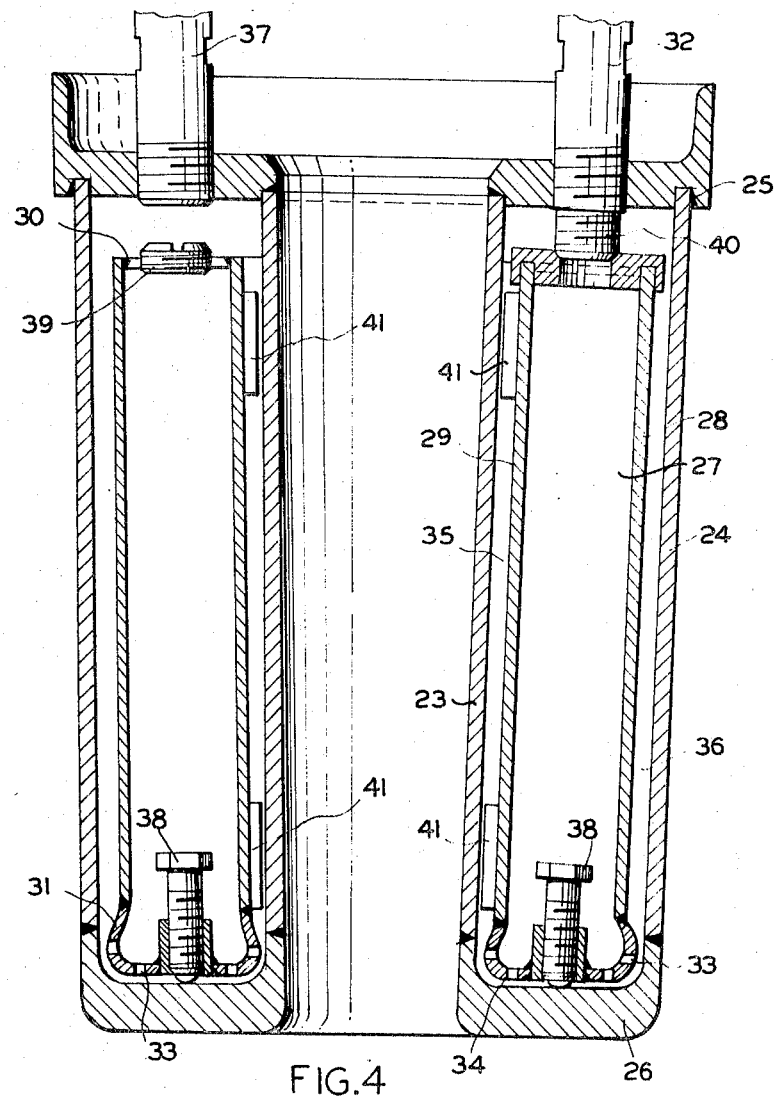
FIG. 4 shows a modification in a blow mold in a longitudinal section.
Figure 5:
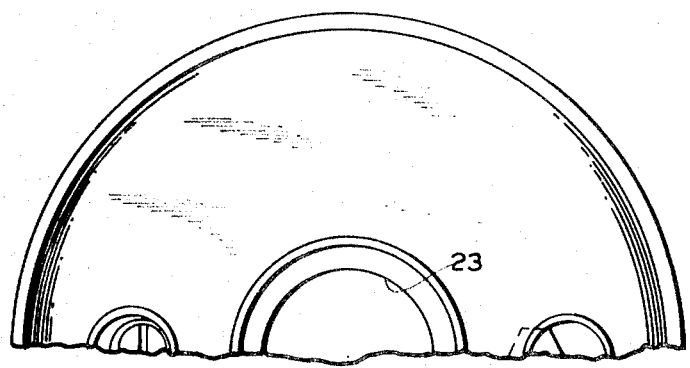
FIG. 5 shows a plan view in the direction of the blow mold foot of the blow mold according to FIG. 4.

FIGS. 4 and 5 show a blow mold, wherein the feed pipe is at the same time a displacement body. In the cooling chamber formed by an inner and an outer pipe jacket 23 and 24 respectively which run conically to the blow mold and which in a cross section are circular shaped, and their frontal surfaces are shut off jointly through the blow mold foot 25 and an annular shell 26 of the blow head. The cooling chamber is essentially coaxially adjusted to an analogously constructed displacement body 27, which is formed of an outer pipe 28 and an inner pipe 29 which are ring shaped in cross section and the opposite lying frontal surfaces which are closed in by ring walls 30 and 31 respectively and which are connected to the feed pipe 32 for feeding the cooling agent which passes through the blow mold foot. The ring wall 31 is shaped as a torus and has on its side turned towards the frontal face of the blow head several nozzle like holes 33, through which the cooling agent is forced into an annular chamber 34 formed in between ring wall 31 and ring shell 26 which has a smaller cross section surface, from where the cooling agent flows along the annular chambers 35 and 36 formed in between the displacement body and the inner and outer jackets in the direction of the blow mold foot to the flow out pipe 37. The inside diameter of the displacement body is here somewhat larger than the smallest inside diameter of the torus and the external diameter of the displacement body is somewhat smaller than the largest diameter of the torus, whereby pressure losses of the cooling agent which flows with a 7m./sec. velocity of flow into the annular chamber 34 are reduced. For regulating the desired velocity of the cooling agent in the area of the annular chamber of the blow head 34 and for influencing the corresponding pressure loss, the displacement body possesses two adjusting screws 38 set in the ring wall 31, or similar means which by activating a socket wrench which is led through the feed pipe 32 and outflow pipe 37 as well as the stuffing-box stud 39 allows an axial movement of the displacement body, when at the same time the screw threading 40 at the connecting place of the feed pipe—displacement body is adjusted. Along the inner jacket surface 29 distributed over the periphery there are several spacing pieces 41 shaped as sheet metal strips welded onto the displacement body, in order to avoid the canting of the displacement body.

We claim:

1. Cooled blow mold having a blow head for industrial furnaces, particularly blast furnaces, comprising an outer and an inner blow mold jacket between which a cooling agent is fed, said jackets enclosing a cooling chamber directly to the blow head, a ring chamber in said cooling chamber whereby the cooling agent may be led from said ring chamber through said cooling chamber to the outflow of the cooling agent connected to the blow mold foot, a concentrical displacement body having a radial ring wall in said cooling chamber receiving said cooling agent, said displacement body dividing said cooling chamber into an outer, an inner and by said radial ring wall into an annular chamber in said blow head, said ring wall having overflow openings for the cooling agent in the cross-sectional area of said outer and inner annular chambers through which the cooling agent is led along both annular chambers to the outflow of the cooling agent.

2. Blow mold according to claim 1, wherein the annular chamber of said blow head is divided by a partition directly next to the feeding mouth, and wherein along the side turned away from the feeding mouth of said partition in the cross-sectional area of the outer and inner annular chambers there is respectively an overflow opening in the ring wall.

3. Blow mold according to claim 1, wherein said displacement body is built as a flow through hollow body.

4. Blow mold for industrial furnaces, according to claim 1, wherein a feed line for a cooling agent going directly to the blow head is built as a displacement body which is coaxially set inside said cooling chamber, the end of said feed line projecting into said blow head, said end having a torus with an outlet nozzle directed to the frontal surface of the blow head.

5. Blow mold according to claim 4, wherein said displacement body is axially movable and fixable in order to change the size of the flow-through cross section in the area of the annular chamber of the blow head.

6. Blow mold according to claim 5 wherein a plurality of regulating units are provided on the tuyere bottom and brace against the inner frontal surface of the annular chamber of the blow head, as well as through an axially tensional movable connection of the feed pipe located in the foot of the blow mold with the displacement body.

7. Blow mold according to claim 6, wherein there is a spacer located in the inner jacket of the displacement body.

8. Blow mold according to claim 1 wherein said outer and inner annular chamber of the cooling chamber is provided each with a fin radially directed, running helically to the blow mold foot.

9. Blow mold according to claim 8, whereby the fins adjacent said blow head run at the beginning at a distance in singular spiral windings which later change into a helical pitch.

* * * * *

UNITED STATES PATENT AND TRADEMARK OFFICE
CERTIFICATE OF CORRECTION

PATENT NO. : 3,627,296
DATED : December 14, 1971
INVENTOR(S) : JOHANNES UERLICHS ET AL.

It is certified that error appears in the above-identified patent and that said Letters Patent are hereby corrected as shown below:

In the priority data on the first page, change "March 10, 1970" to -- March 10, 1969 --.

Signed and Sealed this

Eighth Day of March 1977

[SEAL]

Attest:

RUTH C. MASON
*Attesting Officer*

C. MARSHALL DANN
*Commissioner of Patents and Trademarks*